(12) United States Patent
Khoury

(10) Patent No.: US 7,456,729 B2
(45) Date of Patent: Nov. 25, 2008

(54) POSITION BASED TACTILE REPORTING

(75) Inventor: Sami Khoury, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 180 days.

(21) Appl. No.: 11/438,755

(22) Filed: May 22, 2006

(65) Prior Publication Data

US 2007/0268116 A1    Nov. 22, 2007

(51) Int. Cl.
*H04B 3/36* (2006.01)
(52) U.S. Cl. .............................. 340/407.1; 340/825.36; 340/825.49; 381/315; 434/112
(58) Field of Classification Search .............. 340/407.1, 340/407.2, 825.36, 825.49, 286.1; 381/315; 434/112
See application file for complete search history.

(56) References Cited

U.S. PATENT DOCUMENTS

| | | | | |
|---|---|---|---|---|
| 5,865,405 | A * | 2/1999 | Hesley | 248/118 |
| 6,140,987 | A | 10/2000 | Stein et al. | 345/87 |
| 6,320,496 | B1 * | 11/2001 | Sokoler et al. | 340/407.1 |
| 6,671,618 | B2 * | 12/2003 | Hoisko | 701/205 |
| 6,903,662 | B2 | 6/2005 | Rix et al. | 341/22 |

* cited by examiner

*Primary Examiner*—Daryl C Pope
(74) *Attorney, Agent, or Firm*—Merchant & Gould; Ryan T. Grace

(57) ABSTRACT

Position based tactile reporting provides for adequate and socially acceptable reporting. A tactile element is moved from a first position to a second position to indicate a status. The tactile element is maintained in the second position so that touching the tactile element and detecting the second position determines a status. In another aspect, the tactile element oscillates to indicate status. In this manner, a user may adequately and discretely detect a status of a computing device without engaging in socially inappropriate behavior.

20 Claims, 4 Drawing Sheets

POSITION BASED TACTILE REPORTING

BACKGROUND

Computing devices may provide for the status of messages such as emails, text messages, voicemails and/or telephone calls. Computing devices may also have several other statuses (e.g. low battery, signal strength, etc.). To report such statuses, computing devices may provide an auditory report, a visual report, and/or a vibratory report. These types of reportings are socially inappropriate in many settings. Audio and vibratory reporting may be loud and distracting. Visual reporting forces a user to check the computing device for a visual report (often at inappropriate times).

These types of reportings may also be inadequate in many environments. An audio report may not be heard over loud noises. A vibratory report may not be felt when the computing device is not in contact with a user, and a visual report is ineffective when the user cannot see the computing device.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter.

Position based tactile reporting provides for adequate and socially acceptable status reporting. A tactile element is moved from a first position to a second position to indicate a new status. The tactile element is maintained in the second position so that touching the tactile element and detecting the second position identifies the new status. Also, the tactile element may be oscillated to identify the new status. In this manner, a user may detect a status of a computing device without looking at the computing device, producing a visual report, and/or producing an audio report. Also, position based tactile reporting may not have a reporting period. Accordingly, a user may discretely determine a status of a computing device without engaging in socially inappropriate behavior.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments described herein are referred to alternatively as operations, steps or modules.

Figure 1:
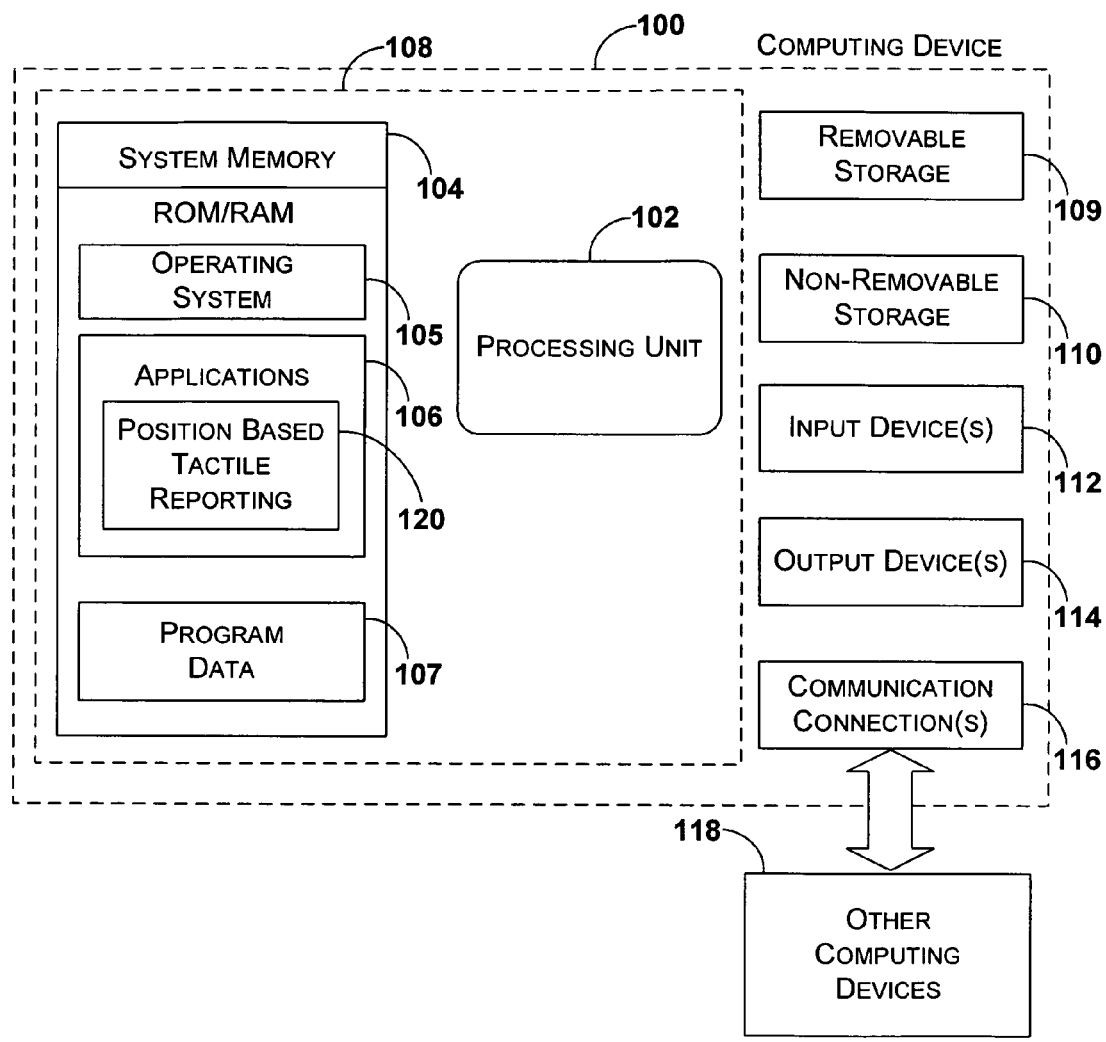
FIG. 1 illustrates an exemplary computing device.
Figure 2:
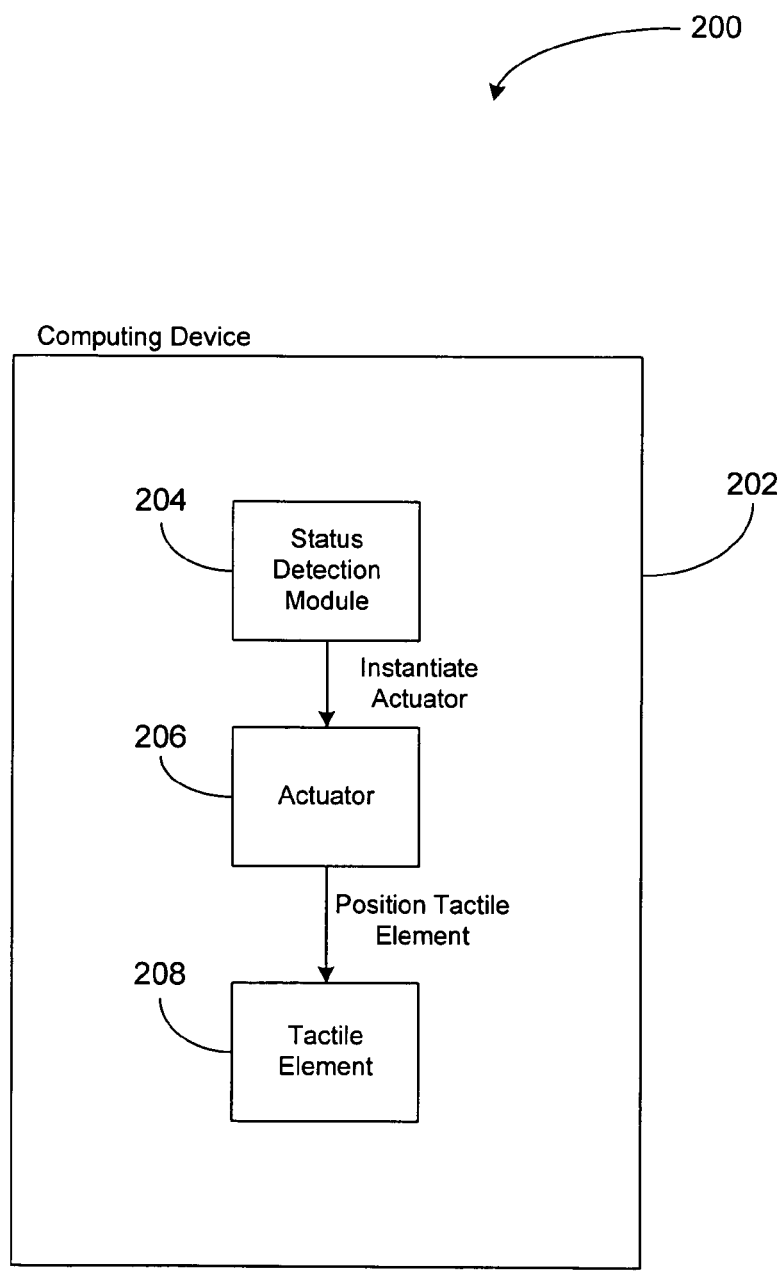
FIG. 2 represents one exemplary system overview for position based tactile reporting.

FIG. 2 represents a system overview for position based tactile reporting. System 200 represents a modular overview of a computing environment. System 200 may include computing device 202. Computing device 202 may include a desktop computing device, mobile computing device, a laptop, a personal digital assistant, a notebook computer, a telephone, a cellular telephone, a key fob and/or any other type of computing device that may be configured to change status, report status, and/or report a status of another device. In one aspect, computing device 202 includes computing device 100 as exemplified in FIG. 1.

System 200 represents a modular overview of computing device 202. System 200 may be integrated as a combination of software and hardware elements, an operating system or any combination thereof. Hardware, software, applications, and/or programs referenced herein may be integrated as a single element or include various elements in communication with one another. Software and/or hardware elements are depicted herein for explanatory purposes only and not for limiting the configuration to multiple elements or a single element performing several functions. For example, as depicted in FIG. 2, system 200 includes computing device 202 having status detection module 204, actuator 206 and tactile element 208. Reference numbers 204-208 may include separate programs and separate hardware in communication. Reference numbers 204-208 may also include a single hardware element or any combination of single and multiple programs and/or hardware elements.

Computing device 202 includes status detection module 204 for detecting a status of computing device 202. In another aspect, status detection module 204 may detect a status of a device other than computing device 202. For example, computing device 202 may include a key fob that detects the status of one or more associated computing devices. In this manner, the associated computing device passes the status information to the key fob to facilitate reporting.

A status may include a status associated with a telephone call, a text message, an email message, a voice message, a battery level, a signal strength, and/or any other status that computing device 202 may facilitate. For example, status detection module 204 may detect that a message is waiting or that a battery level is low. Status detection module 204 may include a program for detecting a status, a servo for detecting a signal associated with a status and/or any other manner for detecting a status of computing device 202.

Computing device 202 may also include actuator 206 for actuating a tactile element. Actuator 206 may include a mechanical actuator, an electrical actuator, a magnetic actuator, and/or any other type of actuator to facilitate the movement of a tactile element. Even though a first position and a second position are recited herein, a tactile element may move between three or more positions to indicate status. A tactile element may move from an inwardly to an outwardly position to indicate a status. A tactile element may move between an upwardly and a downwardly position to indicate status. A tactile element may oscillate to indicate status. In general, a tactile element may move between any set of positions in any orientation to indicate a status.

As examples of actuator types, actuator 206 may include a mechanical actuator having a biasing element for biasing a tactile element in a position. When actuated, a lock may release the tactile element and the biasing element may move the tactile element from a first position to a second position. An electrical actuator may include a servo for moving the tactile element from a first position to a second position. The servo may also move the tactile element from a second position to a first position. A magnetic actuator may include a magnet for maintaining a tactile element in a first position. When actuated, the magnet may release the tactile element and a biasing element may move the tactile element from a first position to a second position.

Computing device 202 includes tactile element 208. Tactile element 208 may include a button, tab, extension, and/or the like. Tactile element 208 may include an existing element of computing device 202 such as a key, button, soft key, antenna, directional pad, and/or the like. Tactile element 208 may include any movable element of computing device 202 that is functional to indicate a status of the computing device. Even though tactile element 208 is depicted as a single tactile element, multiple tactile elements may exist for indicating one status or many statuses.

As an example associated with FIG. 2, computing device 202 may receive a text message. Status detection module 204 identifies the reception of the text message and instantiates actuator 206. Actuator 206 positions tactile element 208 in a position that indicates that a text message has been received. The position may include an outward position of a button. The user may then discretely feel the button to determine whether the button position is outward. When the user desires, the user may push the button inward to reset the tactile element. In another aspect, the tactile element may oscillate. In this manner, a user may detect a status of the computing device at any time after the change of status.

Figure 3:
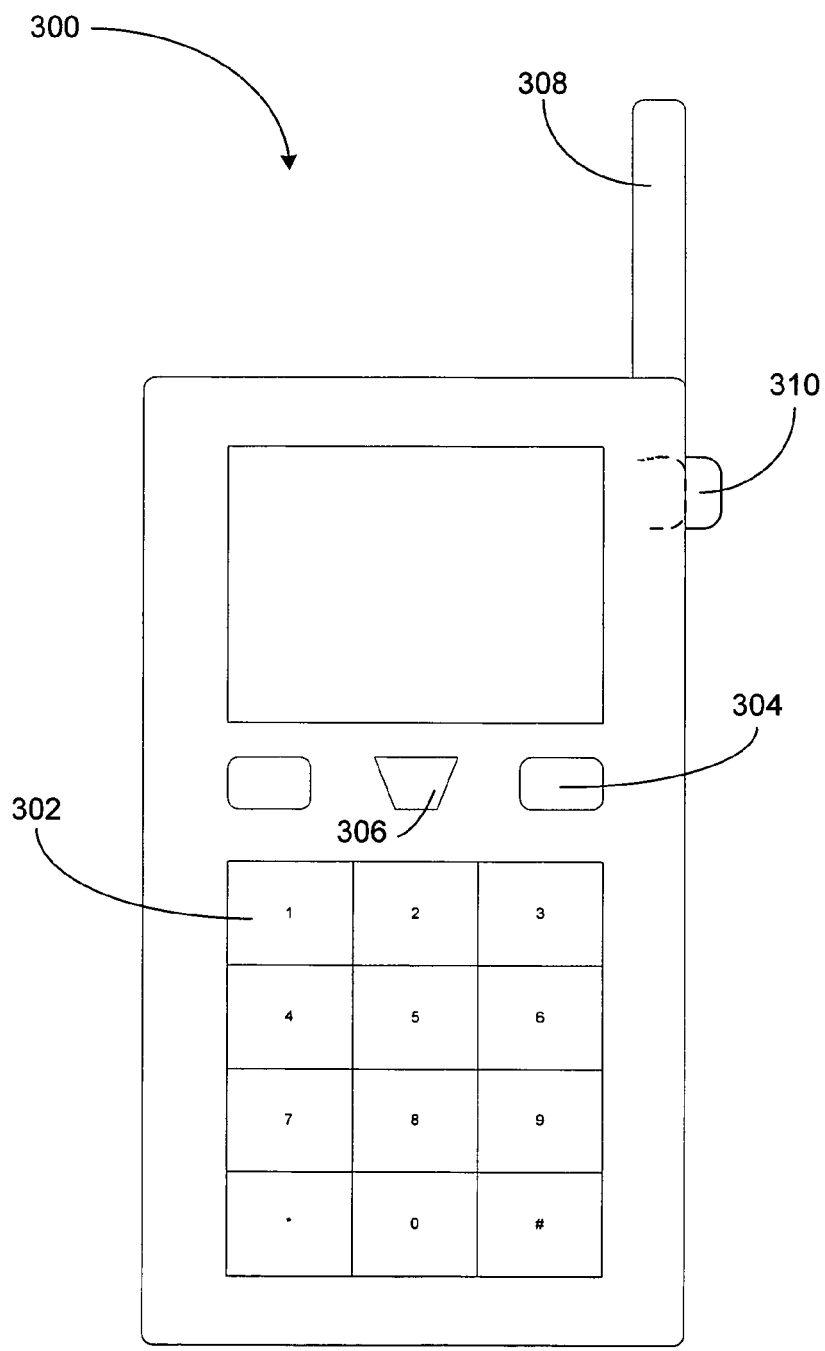
FIG. 3 represents one exemplary computing device for facilitating position based tactile reporting.

FIG. 3 represents one exemplary computing device 300 for facilitating position based tactile reporting. Computing device 300 may include one or more keypad buttons 302, soft key 304, directional pad 306, and/or antenna 308. Computing device 300 also includes tactile element 310. FIG. 3 depicts tactile element 310 moving from a first position to a second position (represented by the dashed line and the solid line). Even though tactile element 310 is depicted as a single element, computing device 300 may include a plurality of tactile elements. Furthermore, keypad button 302, soft key 304, directional pad 306 and/or antenna 308 may also be tactile elements. A tactile element may include any element of computing device 300 functional to move between at least two positions to indicate a status.

Figure 4:
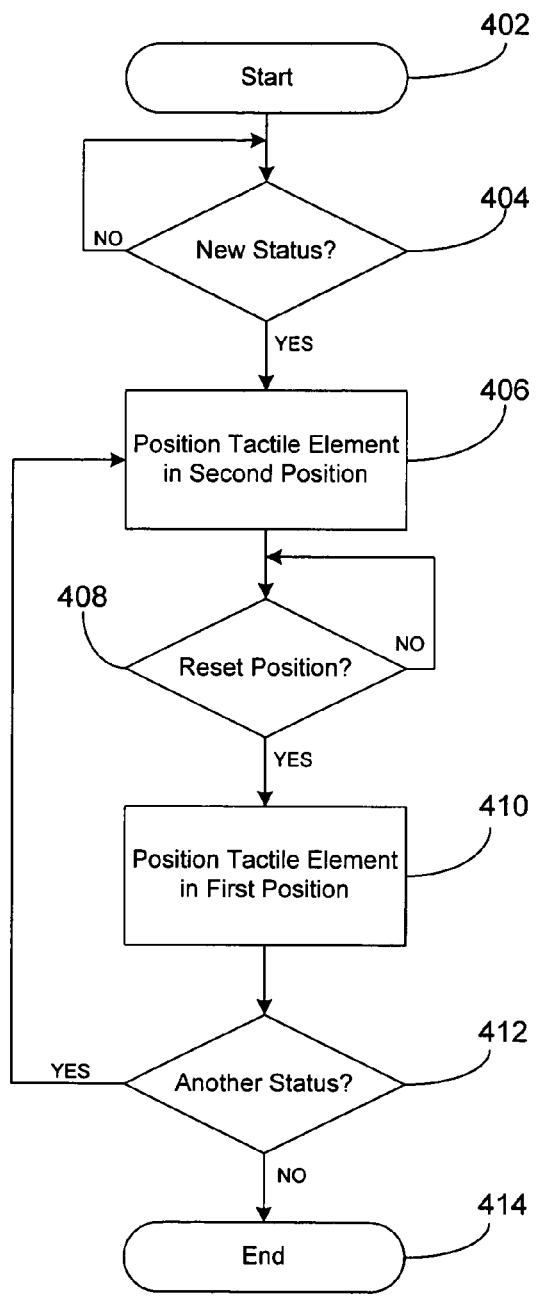
FIG. 4 represents an operational flow diagram for position based tactile reporting.

FIG. 4 represents an operational flow diagram for position based tactile reporting. Operational flow 400 begins at start operation 402 and flows to decision operation 404. At decision operation 404 it is decided whether to indicate a new status. A new status may include the reception of a telephone signal, reception of a message, a waiting voicemail, reception of an email, reception of a text message, a low battery, a weak signal, a roaming signal, and/or the like.

When it is decided not to indicate a new status, operational flow 400 loops back up. When it is decided to indicate a new status, operational flow 400 continues to operation 406. At operation 406, a tactile element is moved from a first position to a second position to indicate the new status.

At decision operation 408, it is decided whether to reset the position of the tactile element. Operational flow 400 loops back up when it is decided not to reset the position of the tactile element. Operational flow 400 continues to operation 410 when it is decided to reset the position of the tactile element. At operation 410, the tactile element is moved from a second position back to the first position. Resetting the position of the tactile element may occur manually by the user. In another aspect, resetting the position of the tactile element is facilitated by an actuator and/or a servo. In another aspect, the tactile element oscillates to indicate status.

At decision operation 412, it is determined whether another status requires indication. If not, operation flow 400 continues to end operation 414. If so, operational flow 400 loops back to operation 406.

Referring to FIG. 1, an exemplary system for implementing the invention includes a computing device, such as computing device 100. In a basic configuration, computing device 100 may include any type of stationary computing device or a mobile computing device. Computing device 100 typically includes at least one processing unit 102 and system memory 104. System memory 104 typically includes operating system 105, one or more applications 106, and may include program data 107. In one embodiment, applications 106 further include application 120 for position based tactile reporting. This basic configuration is illustrated in FIG. 1 by those components within dashed line 108.

Computing device 100 may also have additional features or functionality. For example, computing device 100 may also include additional data storage devices (removable and/or non-removable). Such additional storage is illustrated in FIG. 1 by removable storage 109 and non-removable storage 110. Computing device 100 may also have input device(s) 112 such as a keyboard, mouse, pen, voice input device, touch input device, etc. Output device(s) 114 such as a display, speakers, printer, etc. may also be included.

Computing device 100 also contains communication connection(s) 116 that allow the device to communicate with other computing devices 118, such as over a network or a wireless network. Communication connection(s) 116 is an example of communication media. Communication media typically embodies computer readable instructions, data structures, program modules or other data in a modulated data signal such as a carrier wave or other transport mechanism and includes any information delivery media.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for position based tactile reporting, the method comprising:

receiving a message on a personal digital assistant, wherein the message is at least one member of a group comprising: a text message, an email message, and a voicemail message;

changing a status of the personal digital assistant to indicate that the message is received on the personal digital assistant;

in response to changing the status of the personal digital assistant, instantiating an actuator to release a biasing element and cause a tactile element to move from a first position to a second position; and biasedly maintaining the tactile element in the second position to indicate the change of status, wherein the tactile element is movable from the second position to the first position upon receiving a force to overcome the biasing element.

2. The computer-implemented method of claim 1, wherein the actuator includes at least one member of a group comprising: a mechanical actuator, an electronic actuator, a magnetic actuator, and a servo.

3. The computer-implemented method of claim 1, wherein the tactile element includes at least one member of a group comprising: a key, a button, a soft key, an antenna, and a directional pad.

4. The computer-implemented method of claim 1, further comprising moving the tactile element to a third position.

5. The computer-implemented method of claim 1, wherein the tactile element is movable between at least one member of a group comprising: an inwardly and an outwardly position, and an upwardly and a downwardly position.

6. The computer-implemented method of claim 1, wherein the actuator, the biasing element and the tactile element are located on a secondary device.

7. The computer-implemented method of claim 6, wherein the secondary device is a key fob.

8. The computer-readable storage medium of claim 6, wherein the secondary device is a key fob.

9. The computer-readable storage medium of claim 1, further comprising moving the tactile element to a third position.

10. The computer-readable storage medium of claim 1, wherein the tactile element is movable between at least one member of a group comprising: an inwardly and an outwardly position, and an upwardly and a downwardly position.

11. The computer-readable storage medium of claim 1, wherein the actuator, the biasing element and the tactile element are located on a secondary device.

12. The computer-readable storage medium of claim 1, wherein the message is at least one member of a group comprising; a text message, an email message, a status message, an internal computing device message.

13. A computer-readable storage medium having computer executable instructions for position based tactile reporting, the instructions comprising:

receiving a message on a mobile computing device;

changing a status of the mobile computing device to indicate that the message is received on the mobile computing device;

in response to changing the status of the mobile computing device, instantiating an actuator to release a biasing element and cause a tactile element to move from a first position to a second position;

biasedly maintaining the tactile element in the second position to indicate the change of status;

receiving a force to overcome the biased maintenance of the tactile element and to move the tactile element for the second position back to the first position; and resetting the status of the mobile computing device in response to the tactile element moving back to the first position.

14. The computer-readable storage medium of claim 13, wherein the actuator includes at least one member of a group comprising: a mechanical actuator, an electronic actuator, a magnetic actuator, and a servo.

15. The computer-readable storage medium of claim 13, wherein the tactile element includes at least one member of a group comprising: a key, a button, a soft key, an antenna, and a directional pad.

16. A computer-implemented method for position based tactile reporting, the instructions comprising:

receiving a message on a secondary mobile device, wherein the message indicates that a message was received on a primary computing device and is at least one member of a group comprising: a text message, an email message, and a voicemail message;

in response to receiving the message on the secondary mobile device, instantiating, on the secondary mobile device, an actuator to release a biasing element and cause a tactile element to move from a first position to a second position;

biasedly maintaining the tactile element in the second position to indicate the change of status;

receiving, on the secondary mobile device, a force to overcome the biased maintenance of the tactile element and to move the tactile element for the second position back to the first position; and resetting the secondary mobile device in response to the tactile element moving back to the first position.

17. The computer-implemented method of claim 16, wherein the actuator includes at least one member of a group comprising: a mechanical actuator, an electronic actuator, a magnetic actuator, and a servo.

18. The computer-implemented method of claim 16, wherein the tactile element includes at least one member of a group comprising: a key, a button, a soft key, an antenna, and a directional pad.

19. The computer-implemented method of claim 16, wherein the tactile element is movable between at least one member of a group comprising: an inwardly and an outwardly position, and an upwardly and a downwardly position.

20. The computer-implemented method of claim 16, wherein the secondary device is a key fob.

* * * * *